United States Patent [19]

Koivunen et al.

[11] 4,450,735

[45] May 29, 1984

[54] PLANETARY TRANSMISSION WITH A SPRING APPLIED CENTRIFUGALLY SENSITIVE CLUTCH

[75] Inventors: Erkki A. Koivunen, Livonia; James F. Sherman, Brighton both of Mich.

[73] Assignee: General Motors Corporation, Detroit, Mich.

[21] Appl. No.: 352,953

[22] Filed: Feb. 26, 1982

[51] Int. Cl.³ .......................... F16H 3/74; F16H 57/10
[52] U.S. Cl. ................................. 74/781 R; 74/752 E
[58] Field of Search .......................... 74/781 R, 752 E; 192/105 B, 103 A

[56] References Cited

U.S. PATENT DOCUMENTS

| | | | |
|---|---|---|---|
| 2,116,234 | 5/1938 | Cotterman | 74/781 R |
| 2,140,690 | 12/1938 | Cotterman | 74/781 R |
| 2,189,220 | 2/1940 | Osborne | 74/781 R |
| 2,198,072 | 4/1940 | Banker | 74/781 R |
| 2,270,536 | 11/1942 | Lenning | 74/781 R |
| 2,427,346 | 9/1947 | Banker | 192/103 |
| 2,445,561 | 7/1948 | Carnagua | 74/781 R |
| 2,985,037 | 5/1961 | Schoenle et al. | 74/781 R |
| 3,327,565 | 6/1967 | Grattan | 74/752 E |
| 3,978,742 | 9/1976 | Abbott | 74/781 R |
| 4,123,952 | 11/1978 | Wayman | 74/781 R |

FOREIGN PATENT DOCUMENTS

| | | | |
|---|---|---|---|
| 1164840 | 3/1964 | Fed. Rep. of Germany | 192/105 B |
| 2211603 | 9/1973 | Fed. Rep. of Germany | 192/105 B |
| 2300363 | 7/1974 | Fed. Rep. of Germany | 192/105 B |
| 3019377 | 11/1981 | Fed. Rep. of Germany | 192/105 B |
| 1096552 | 6/1955 | France | 192/105 B |
| 1198001 | 12/1959 | France | 192/105 B |
| 10849 | 2/1981 | Japan | 74/752 E |
| 1378910 | 12/1974 | United Kingdom | 74/781 R |

*Primary Examiner*—Allan D. Herrmann
*Assistant Examiner*—D. Wright
*Attorney, Agent, or Firm*—Donald F. Scherer

[57] ABSTRACT

A planetary transmission has a fluid applied brake for a low speed ratio and a fluid release spring applied clutch for a high speed ratio. The clutch apply springs respond to a centrifugally actuated member such that below a predetermined output speed, the springs are not compressed sufficiently to cause engagement of the clutch. The clutch is maintained disengaged by the fluid pressure which engages the brake regardless of output speed. The interchange of the brake and clutch are selectively controlled by controlling the fluid pressure source.

3 Claims, 1 Drawing Figure

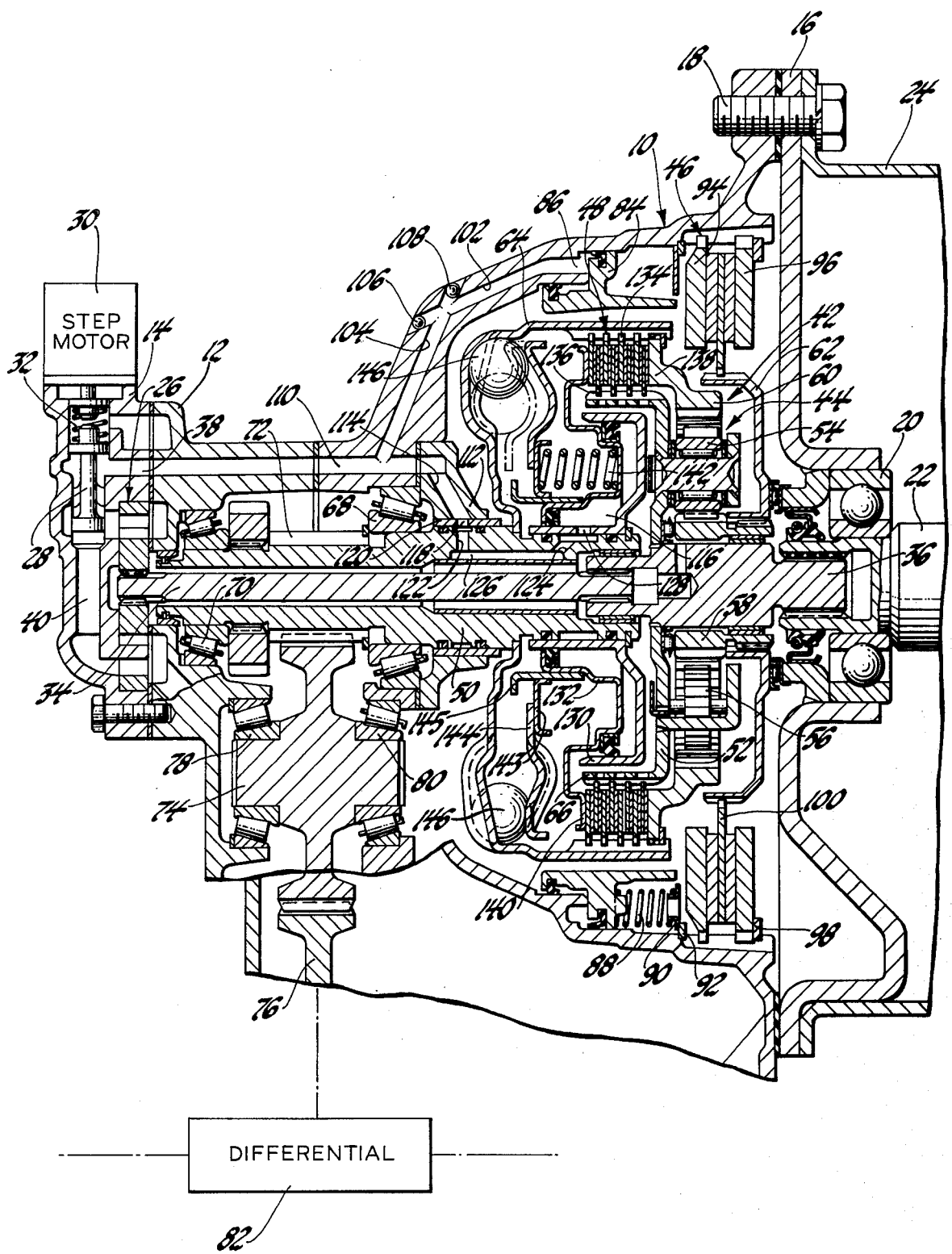

PLANETARY TRANSMISSION WITH A SPRING APPLIED CENTRIFUGALLY SENSITIVE CLUTCH

This invention relates to power transmissions and more particularly to planetary transmissions having two speed ratios.

It is an object of this invention to provide an improved planetary transmission having two speed ratios wherein the low ratio is established by a fluid pressure apply-spring release brake and the high ratio is established by a pressure release-spring apply clutch which clutch has a centrifugal operator for preventing engagement of the clutch below a predetermined output speed.

A further object of this invention is to provide an improved planetary transmission having a fluid pressure apply brake to establish one speed ratio and a spring applied clutch for establishing another speed ratio wherein the clutch is released by the brake apply pressure and also includes a centrifugal operator which prevents the engagement of the clutch if the speed of the transmission output is below a predetermined value regardless of the apply pressure of the brake.

These and other objects and advantages of the present invention will be more apparent from the following description and drawing which is a cross-sectional elevational view of a transmission incorporating the present invention.

Referring to the drawing, there is seen a planetary transmission having a multiple piece housing which includes a main housing 10, an extension housing 12, a pump housing and end cover 14, and an end plate 16. The end plate 16 is secured to the main housing 10 by a plurality of fasteners, such as 18. The end plate 16 has disposed therein a bearing member 20 which rotatably supports a drive shaft 22 which is the output member of a prime mover such as an electric motor, not shown. The electric motor is enclosed in a motor housing 24 which is secured to the main housing 10 by the fasteners 18.

The extension housing 12 is secured to the main housing 10 and has secured thereto the pump housing and end cover 14. The pump housing and end cover 14 has disposed therein a conventional I-X type gear pump generally designated 26, and a pressure regulator valve 28. The pressure regulator valve 28 is responsive to a stepping motor 30 which is operable to control the force in a spring 32 which establishes the regulated pressure level. The selectively operable stepping motor 30 may be controlled by many of the well-known electrical control systems. The pump 26 is driven by a quill shaft 34 which is drivingly connected to a transmission input shaft 36 which in turn is driven by the drive shaft 22.

When the stepping motor 30 is operated and the pump 26 is being rotated by the shaft 34, an elevated fluid pressure level is established in a pump output cavity 38. Excess fluid is bypassed by the regulator valve 28 to a pump inlet cavity 40. When the stepping motor 30 is at its minimum travel, the regulator valve 28 is operable to bypass all of the fluid of pump 26 at a very low pressure level.

The housing 10 encloses a planetary transmission, generally designated 42, and includes a planetary gear set 44, a low ratio brake 46, a high ratio clutch 48 and an output shaft 50. The planetary gear set 44 includes a carrier member 52 which rotatably supports a plurality of pinion gears 54 and a plurality of pinion gears 56 which mesh with pinion gears 54. The planetary gear set 44 also includes a sun gear 58 and a ring gear 60 which mesh with pinion gears 54 and pinion gears 56, respectively. The carrier 52 is secured to the transmission input shaft 36 and therefore is rotated by the prime mover drive shaft 22. The sun gear 58 is drivingly connected through a hub 62 to the low ratio brake 46 and is therefore held stationary whenever the low ratio brake 46 is engaged.

The ring 60 is drivingly connected with the transmission output shaft 50 through a housing 64 which forms a portion of the clutch 48. The carrier 52 includes a hub portion 66 which also forms a part of the clutch 48. The transmission output shaft 50 is rotatably supported in the housing 10 and the housing 12 by bearings 68 and 70, respectively. Intermediate the bearings 68 and 70, the output shaft 50 has formed thereon a gear member 72 which meshes with an idler gear 74 which in turn meshes with a differential input gear 76. The idler gear 74 is rotatably supported in bearings 78 and 80. The differential input gear 76 is the input to a conventional differential shown diagramatically at 82 which is operable to provide a conventional drive to the vehicle wheels, not shown.

The brake 46 is a fluid applied-spring released brake and includes an annular piston 84 slidably disposed in the housing 10 and cooperating therewith to form a brake apply chamber 86. The piston 84 is urged toward the disengage position shown by a plurality of springs 88 which are compressed between the piston 84 and a spring seat 90 which is positioned in housing 10 by a locking ring 92. The brake 46 further includes a pressure plate 94, adapted to be abutted by the piston 84 when brake engagement occurs, a back-up plate 96, positioned in housing 10 by a lock ring 98, and a friction plate 100 disposed between the plates 94 and 96 and having a splined inner diameter drivingly connected to the hub 62 and therefore sun gear 58. The plates 94 and 96 are both splined to the housing 10 such that on application of sufficient pressure to chamber 86, the piston 84 will cause frictional engagement of the plates 94, 96 and 100 resulting in the sun gear 58 being held stationary.

The chamber 86 is in fluid communication with a passage 102 which is intersected by a passage 104, both of which are formed in the housing 10 and are closed at their outer end by balls 106 and 108, respectively. The passage 104 intersects a passage 110 formed in the housings 10 and 12 and provides communication with the pump output cavity 38. The passage 110 is also in fluid communication with a fluid passage 114 formed in a housing 112. The passage 114 is in fluid communication with a clutch release chamber 116 through an opening 118, in a bushing 120, a pair of substantially radial passages 122 and 124, formed in output shaft 50, and connected by an axial passage 126 and a passage 128 formed in a clutch piston housing 130. The clutch piston housing 130 cooperates with a clutch piston 132 slidably disposed therein to form the clutch release chamber 116.

The clutch piston housing 130 and clutch piston 132 are components of the clutch 48 which also includes a plurality of interleaved friction plates or discs 134 and 136 alternately spaced and respectively splined to housing 64 and hub 66. The plates 134 and 136 are restricted in rightward movement by a plate 138 formed integrally with the ring gear 60. The piston 132 has an apply portion 140 disposed to operate on the plates 134 and 136 to cause frictional engagement resulting in unitary rotation of carrier 52 and ring gear 60 which, as is well-known, results in a direct drive through the planetary gear set 44.

The clutch piston 132 is urged toward the engaged condition by a plurality of spring members 142, which are disposed between the piston 132 and a spring seat 143 which abuts a clutch control member 144 in the position shown. When the member 144 moves to the phantom position, the spring seat 143 abuts a retainer 145 which is secured to the piston 132. Thus, the clutch control member 144 is free of axial spring forces. The clutch control member 144 cooperates with the housing 64 and a plurality of spheres or balls 146 to form a centrifugal operator for clutch 48. Since the housing 64 rotates in unison with the transmission output shaft 50, the centrifugal operator will be responsive to transmission output speed. When the transmission output shaft is at zero or very low speeds, the clutch control member 144 will be in the phantom position shown such that the force stored in spring 142 will be retained within piston 132 and retainer 145 and therefore be zero relative to clutch control member 144. A clutch apply spring force will not be present during this condition. When the transmission shaft output speed is increased from zero to a speed of approximately 10 mph vehicle speed, the spheres 146 are moved progressively from the inner phantom position to the outer solid position, at which solid position the springs 142 have sufficient force stored therein to enforce the engagement of clutch 48.

As previously mentioned, the chamber 116 is subjected to fluid pressure which is the same fluid pressure present in chamber 86 to enforce engagement of brake 46. If the brake apply pressure is present, the piston 132 is moved leftward against the apply springs 142 maintaining the clutch 48 disengaged regardless of the speed of shaft 50.

If the prime mover shaft 22 is stationary, the pump 26 will be stationary such that the fluid pressure will be zero. Assuming the stepping motor 30 is actuated to full displacement when the prime mover shaft 22 begins rotation, the pump 26 will develop pressure in chamber 38, however, until this pressure increases to a level sufficient to overcome the return springs 88 of brake 46, the brake 46 will be disengaged. If, at this time, the clutch 48 is spring engaged, the planetary gear set 44 will be conditioned for a 1:1 drive ratio and vehicle movement would occur. To prevent this occurrence, the centrifugal operator is responsive to output speed and therefore maintains the clutch 48 disengaged. When sufficient pressure is present to actuate brake 46, a reduction drive ratio is present from the input shaft 36 to the output shaft 50 such that vehicle acceleration can occur.

As the vehicle accelerates, the centrifugal operator will be conditioned as explained above to position the springs 142 such that selective clutch engagement can occur. To effect the ratio interchange through the disengagement of brake 46 and engagement of the clutch 48, the pressure source, comprised of the pump 26, regulator valve 28 and stepping motor 30, is conditioned for substantially zero pressure. As the pressure in chamber 38 is decreasing, the brake 46 will become disengaged while the clutch 48 will be engaged resulting in a 1:1 or direct drive ratio from input shaft 36 to output shaft 50. To provide a smooth transition from ratio to ratio, the brake 46 and clutch 48 may be applied and released with separate regulated oils controlled in response to any or all of the following: throttle position, vehicle speed, motor torque or clutch pressure.

The vehicle can be driven in forward or reverse depending upon the direction of rotation of the prime mover shaft 22. Since the prime mover is an electric motor, reversal of the prime mover 22 is easily obtained. By way of example, if the sun gear 58 is provided with twenty seven teeth and the ring gear 60 is provided with sixty-seven teeth, the low ratio will be equal to 1.675. If the output gear 72 is provided with fourteen teeth and the differential input gear 76 is provided with one hundred two teeth, a final drive ratio of 7.29 is provided. By utilizing tires having a conventional rolling radius, a N/V of one hundred seventeen can be provided during high ratio operation. With such N/V a vehicle speed of 35 mph will be attained with an electric motor speed of approximately 4100 rpm. This would permit a top speed of slightly over 20 mph during low speed ratio operation. Obviously, these values can be readily changed by altering the number of gear teeth. It should also be appreciated that the two-speed planetary transmission shown, can be incorporated with a multi-speed transmission to extend the ratio coverage in a well-known manner.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A transmission comprising; an input shaft; an output shaft coaxially aligned with the input shaft; housing means for rotatably supporting said input and output shafts; planetary gears means including a first member drivingly connected with said input shaft; a second member drivingly connected with said output shaft and a third member; fluid operated brake means disposed in said housing and being operatively connected with said third member of said planetary gear means and including a fluid pressure operated piston which is operable when pressurized to engage said brake means for establishing a reduction drive ratio in said planetary gear means; clutch means selectively operable for drivingly connecting said input shaft to said output shaft and including a fluid pressure operated means operable when pressurized to disengage said clutch means, spring engagement means for urging said pressure operated means toward engagement of said clutch means and centrifugal control means operatively connected for rotation with said output shaft for generating a force in said spring engagement means when the rotary speed of the output shaft is greater than a predetermined value; and fluid pressure source means drivingly connected with said input shaft for selectively pressurizing said brake means into engagement and said clutch means out of engagement including selectively operable control means for controlling the pressure level of said fluid pressure source means whereby said brake means can be disengaged and said clutch means will be spring loaded into engagement if the rotary speed of said output shaft is above said predetermined speed.

2. A transmission comprising; an input shaft; an output shaft coaxially aligned with the input shaft; housing means for rotatably supporting said input and output shafts; planetary gear means including a first member drivingly connected with said input shaft; a second member drivingly connected with said output shaft and a third member; fluid operated brake means disposed in said housing and being operatively connected with said third member of said planetary gear means and including a fluid pressure operated piston which is operable when pressurized to engage said brake means for establishing a reduction drive ratio in said planetary gear means; clutch means selectively operable for drivingly connecting said input shaft to said output shaft and including a fluid pressure operated means operable when pressurized to disengage said clutch means, and spring engagement means for urging said pressure operated means toward engagement of said clutch means; centrifugal control means including a centrifugal housing operatively connected for rotation with said output shaft; a clutch control member operatively connected to said spring engagement means and a plurality of spheres disposed between said centrifugal housing and said clutch control member which move radially outward in response to output shaft speed to force axial separation of the centrifugal housing and the clutch control member to generate a force in said spring engagement means when the rotary speed of the output shaft is greater than a predetermined value; and fluid pressure source means drivingly connected with said input shaft for selectively pressurizing said brake means into engagement and said clutch means out of engagement including selectively operable control means for controlling the pressure level of said fluid pressure source means whereby said brake means can be disengaged and said clutch means will be spring loaded into engagement if the rotary speed of said output shaft is above said predetermined speed.

3. A transmission comprising; an input shaft; an output shaft coaxially aligned with the input shaft; housing means for rotatably supporting said input and output shafts; planetary gear means including a first member drivingly connected with said input shaft; a second member drivingly connected with said output shaft and a third member; fluid operated brake means disposed in said housing and being operatively connected with said third member of said planetary gear means and including a fluid pressure operated piston which is operable when pressurized to engage said brake means for establishing a reduction drive ratio in said planetary gear means; clutch means selectively operable for drivingly connecting said input shaft to said output shaft and including a fluid pressure operated means operable when pressurized to disengage said clutch means and spring engagement means for urging said pressure operated means toward engagement of said clutch means; centrifugal control means operatively connected for rotation with said output shaft and including radially movable means for enforcing axial movement of a portion of the centrifugal control means to generate a force in said spring engagement means when the rotary speed of the output shaft is greater than a predetermined value; and fluid pressure source means drivingly connected with said input shaft for selectively pressurizing said brake means into engagement and said clutch means out of engagement including selectively operable control means for controlling the pressure level of said fluid pressure source means whereby said brake means can be disengaged and said clutch means will be spring loaded into engagement if the rotary speed of said output shaft is above said predetermined speed.

* * * * *